United States Patent
Inoue

(10) Patent No.: US 8,970,142 B2
(45) Date of Patent: Mar. 3, 2015

(54) CONTROL APPARATUS FOR LINEAR MOTOR, AND LINEAR MOTOR APPARATUS

(75) Inventor: Masashi Inoue, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/876,106

(22) PCT Filed: Sep. 26, 2011

(86) PCT No.: PCT/JP2011/071834
§ 371 (c)(1),
(2), (4) Date: Mar. 26, 2013

(87) PCT Pub. No.: WO2012/043448
PCT Pub. Date: Apr. 5, 2012

(65) Prior Publication Data
US 2013/0187573 A1   Jul. 25, 2013

(30) Foreign Application Priority Data
Sep. 30, 2010   (JP) ................................. 2010-220726

(51) Int. Cl.
*H02P 25/06*   (2006.01)
(52) U.S. Cl.
USPC .......... 318/135; 318/119; 318/400.02; 701/37
(58) Field of Classification Search
USPC ................. 318/115, 119, 135, 400.02; 701/37
See application file for complete search history.

(56) References Cited

U.S. PATENT DOCUMENTS

| | | | | |
|---|---|---|---|---|
| 5,057,759 A | * | 10/1991 | Ueda et al. | 318/616 |
| 5,481,168 A | * | 1/1996 | Mutoh et al. | 318/432 |
| 5,585,709 A | * | 12/1996 | Jansen et al. | 318/807 |
| 5,650,700 A | * | 7/1997 | Mutoh et al. | 318/432 |
| 6,014,006 A | * | 1/2000 | Stuntz et al. | 318/804 |
| 6,518,718 B2 | * | 2/2003 | Koga et al. | 318/38 |

(Continued)

FOREIGN PATENT DOCUMENTS

| | | |
|---|---|---|
| CN | 101133547 A | 2/2008 |
| CN | 101273520 A | 9/2008 |

(Continued)

OTHER PUBLICATIONS

Takeda, Yoji et al., "Design and Control of Interior Permanent Magnet Synchronous Motor", Jul. 2004, pp. 111-115, third impression of the first edition; w/partial English translation (9 pages).

(Continued)

*Primary Examiner* — Paul Ip
(74) *Attorney, Agent, or Firm* — Westerman, Hattori, Daniels & Adrian, LLP

(57) ABSTRACT

A control apparatus (10) includes a position detection unit (108) which detects a position of a mover of a linear motor (20) based on a change in an output signal from a magnetic sensor (27), a position control unit (102) which calculates a speed command value based on the position of the mover detected by the position detection unit (108) and a position command value of an external input, an estimation unit (150) which estimates a moving speed of the mover from a current value of a current flowing to a plurality of coils of the linear motor (20), a speed control unit (104) which calculates a current command value based on the speed command value and the estimated moving speed, and a power converter (106) which supplies power to the plurality of coils according to the current command value.

4 Claims, 8 Drawing Sheets

(56) References Cited

U.S. PATENT DOCUMENTS

| | | | |
|---|---|---|---|
| 6,668,202 B2* | 12/2003 | Makino et al. | 700/56 |
| 6,936,990 B2* | 8/2005 | Oyama et al. | 318/632 |
| 8,310,182 B2* | 11/2012 | Nomura | 318/400.02 |
| 8,474,570 B2* | 7/2013 | Yanai | 180/446 |
| 8,566,056 B2* | 10/2013 | Lu et al. | 702/96 |
| 8,700,261 B2* | 4/2014 | Muragishi et al. | 701/37 |
| 8,803,466 B2* | 8/2014 | Yoshiura et al. | 318/600 |
| 2001/0028229 A1* | 10/2001 | Koga et al. | 318/38 |
| 2002/0180398 A1* | 12/2002 | Nakatsugawa et al. | 318/700 |
| 2003/0097193 A1* | 5/2003 | Makino et al. | 700/42 |
| 2003/0184251 A1* | 10/2003 | Oyama et al. | 318/607 |
| 2009/0267547 A1* | 10/2009 | Watanabe | 318/400.02 |
| 2009/0267550 A1* | 10/2009 | Hida et al. | 318/400.15 |
| 2010/0134064 A1* | 6/2010 | Heikkila | 318/802 |
| 2011/0156619 A1* | 6/2011 | Nomura | 318/135 |
| 2011/0313717 A1* | 12/2011 | Lu et al. | 702/147 |
| 2012/0239198 A1* | 9/2012 | Orita et al. | 700/260 |
| 2013/0057191 A1* | 3/2013 | Yoshiura et al. | 318/600 |
| 2013/0138300 A1* | 5/2013 | Hayama | 701/43 |
| 2013/0184935 A1* | 7/2013 | Muragishi et al. | 701/37 |

FOREIGN PATENT DOCUMENTS

| | | |
|---|---|---|
| JP | 2004-023936 A | 1/2004 |
| JP | 2004-166326 A | 6/2004 |
| JP | 2006-087178 A | 3/2006 |
| JP | 2007-089336 A | 4/2007 |
| JP | 2009-71930 A | 4/2009 |

OTHER PUBLICATIONS

"Vertical-Type MR Sensor Technical Data", Oct. 1, 2005, Kohden Co., Ltd.,<http://www.hkd.co.jp/technique/img/amr-note1.pdf>; w/English translation (9 pages).

International Search Report of PCT/JP2011/071834, mailing date Dec. 27, 2011.

Chinese Office Action dated Nov. 3, 2014, issued in Chinese Patent Application No. 2011800465465, w/English translation (12 pages).

Japanese Office Action dated Jul. 1, 2014, issued in corresponding Japanese Patent Application No. 2010-220726 with English translation (6 pages).

* cited by examiner

CONTROL APPARATUS FOR LINEAR MOTOR, AND LINEAR MOTOR APPARATUS

TECHNICAL FIELD

The present invention relates to a control apparatus for a linear motor, and a linear motor apparatus.

Priority is claimed on Japanese Patent Application No. 2010-220726, filed Sep. 30, 2010, the content of which is incorporated herein by reference.

BACKGROUND ART

In the positioning control of a linear motor, a linear scale is used to increase a positioning accuracy. However, when a mover of the linear motor has a long range of motion, it is necessary to increase the length of the linear scale. In addition, it is also necessary to use a linear scale having less distortion. Therefore, the manufacturing cost of the linear motor is increased.

Accordingly, a linear scale is only mounted in a range of motion in which positioning control is needed, so that the manufacturing cost is reduced (Patent Literature 1).

In addition, the magnetism of a drive magnet of a linear motor is detected using an MR sensor attached to a mover and a position of the mover is calculated from the detected magnetic strength to perform the positioning control.

CITATION LIST

Patent Literature

[Patent Literature 1] Japanese Unexamined Patent Application, First Publication No. 2004-023936

SUMMARY OF INVENTION

Problems to be Solved by the Invention

In the technique described in Patent Literature 1, when positioning control is needed in all range of motion, a linear scale is mounted in all the range of motion. Therefore, there is a problem that the cost is not reduced.

When the position of the mover is calculated by detecting the magnetism of the drive magnet using the MR sensor, an attachment error of the MR sensor, an attachment error of the drive magnet, or the like occurs. Therefore, there is a problem that the accuracy of the positioning control is reduced because errors may be included in the calculated position and thereby the accuracy of the control based on the speed calculated from the calculated position is reduced.

An object of the present invention is to provide a control apparatus for a linear motor and a linear motor apparatus in which a positioning accuracy of the linear motor can be improved without using a linear scale.

Means for Solving the Problem

A control apparatus for a linear motor of the present invention, which includes a magnet unit which has a plurality of drive magnets in which N-poles and S-poles are alternately arranged in a row, and an armature which has a plurality of coils, and in which any one of the armature and the magnet unit is a mover, and the mover moves in an arrangement direction in which the drive magnets are arranged by a magnetic field generated by allowing a current to flow to the plurality of coils of the armature and a magnetic field generated by the plurality of drive magnets of the magnet unit, includes: a position detection unit which detects a position of the mover based on a change in a signal output from a magnetic sensor which the armature has, the magnetic sensor outputting the signal according to a direction of the magnetic field generated by the drive magnets; a position control unit which calculates a speed command value based on the position of the mover detected by the position detection unit and a position command value input from outside the control apparatus; an estimation unit which estimates a moving speed of the mover from a current value of the current flowing to the plurality of coils of the linear motor; a speed control unit which calculates a current command value based on the speed command value calculated by the position control unit and the moving speed of the mover estimated by the estimation unit; and a power converter which supplies power to the plurality of coils according to the current command value calculated by the speed control unit.

Effects of the Invention

According to the present invention, it is possible to improve a positioning accuracy of a linear motor without using a linear scale.

DESCRIPTION OF EMBODIMENTS

Figure 1:
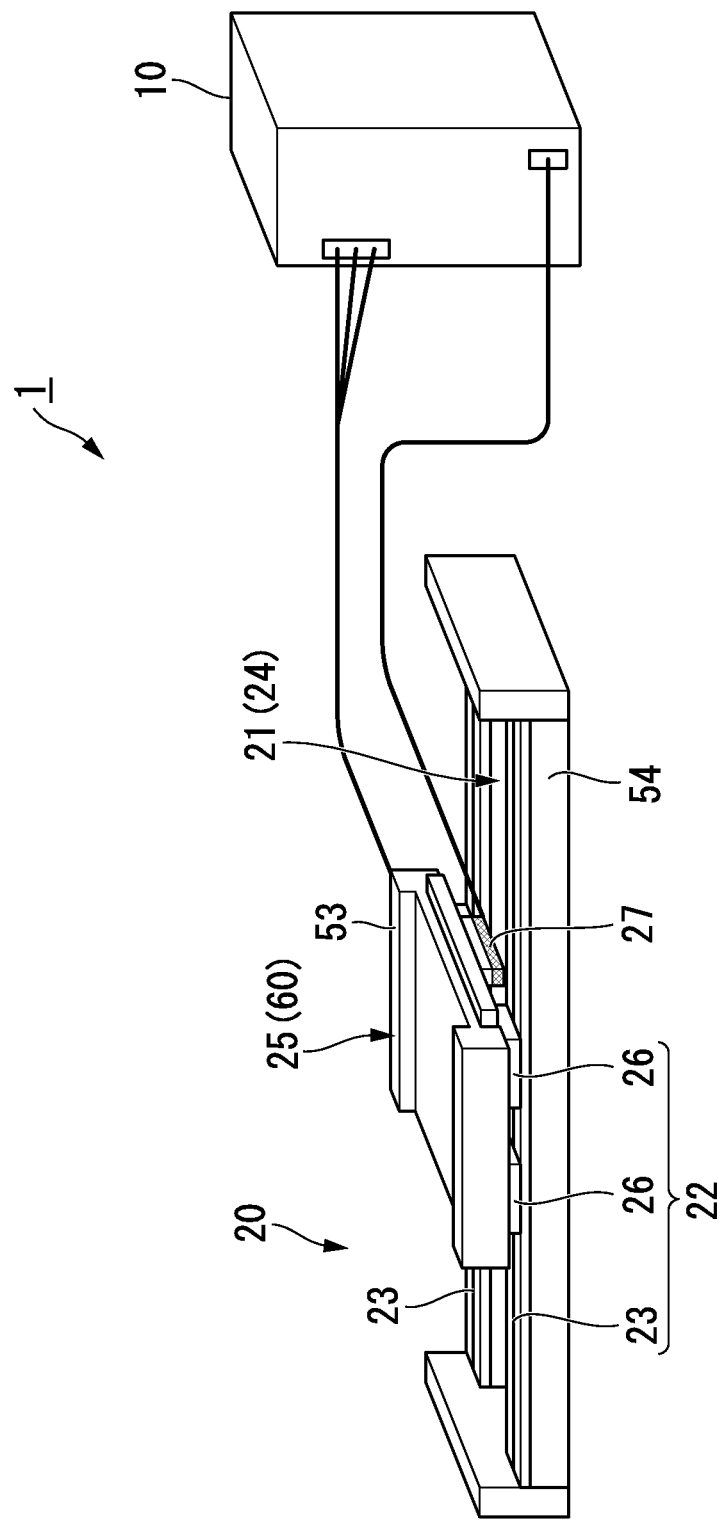
FIG. 1 is a schematic view showing a linear motor apparatus 1 of a first embodiment.

Hereinafter, embodiments of a control apparatus for a linear motor according to the present invention are described referring to the drawings.

First Embodiment

FIG. 1 is a schematic view showing a linear motor apparatus 1 of a first embodiment. The linear motor apparatus 1 has a control apparatus 10 and a linear motor 20. The control apparatus 10 is an apparatus which performs control to drive the linear motor 20. The linear motor 20 is provided with a long stator 21, a mover 25 which moves on the stator 21, and a pair of guide apparatuses 22, 22 on which the stator 21 and the mover 25 are mounted.

The guide apparatus 22 is composed of a track rail 23 and a slide block 26 which are assembled with balls interposed therebetween. The track rail 23 of the guide apparatus 22 is fixed to a base 54 of the stator 21. The slide block 26 of the guide apparatus 22 is fixed to the mover 25. Accordingly, the mover 25 is freely guided along the track rail 23 on the stator 21.

The stator 21 is provided with a plurality of drive magnets 24 arranged between the pair of track rails 23, 23. A plurality of the drive magnets 24 are arranged so that magnetic poles of N-poles and S-poles are alternately arranged in a moving direction of the mover 25 (hereinafter, referred to as the moving direction). The respective drive magnets 24 have the same length in the moving direction, and a constant thrust force is obtained regardless of the position of the mover 25.

The mover 25 is provided with an armature 60 which has a plurality of coils, a table 53 to which a moving target is attached, and an MR (Magnetoresistive Element) sensor 27. The MR sensor 27 is a type of magnetic sensor. The MR sensor 27 outputs a signal according to a direction of a magnetic flux line of a magnetic field which is generated by the drive magnets 24 arranged in the stator 21 to the control apparatus 10.

Figure 2:
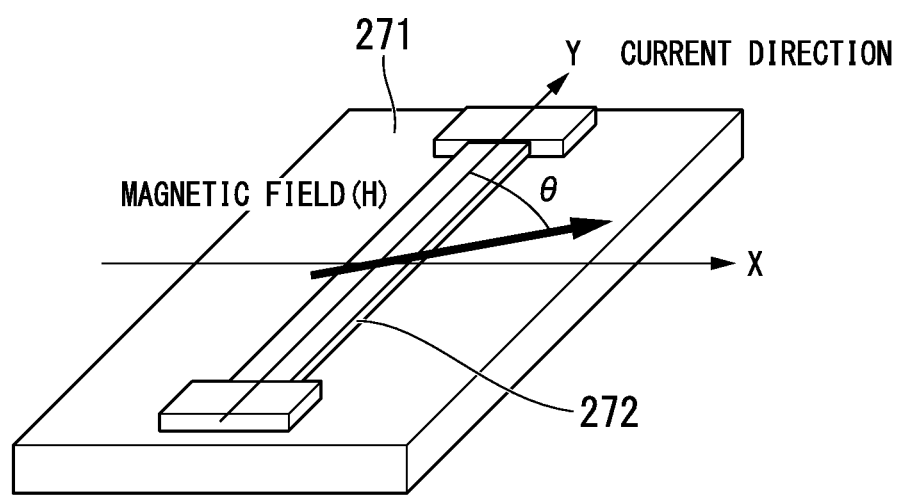
FIG. 2 is a perspective view showing a principle of an MR sensor 27 of the first embodiment.

FIG. 2 is a perspective view showing a principle of the MR sensor 27 of the first embodiment.

The MR sensor 27 has a silicon (Si) or glass substrate 271 and a magnetoresistive element 272 which is formed on the substrate 271 and made of a ferromagnetic thin-film metal of an alloy having ferromagnetic metals such as nickel (Ni) and iron (Fe) as main components. The resistance value of the magnetoresistive element 272 changes according to an angle which is formed by a direction of the current flow (Y-axis direction) and a direction of the magnetic flux passing through the magnetoresistive element 272.

The MR sensor 27 has two full bridge circuits configured by combining a plurality of the magnetoresistive elements 272. The two full bridge circuits are disposed so as to output two signals (a cosine-wave signal, a sine-wave signal) having a phase difference of 90°.

An element having a resistance value which varies with a particular magnetic field direction is referred to as an AMR (Anisotropic Magneto-Resistance Element) sensor (reference literature: "Vertical-Type MR Sensor Technical Data", [online], Oct. 1, 2005, KOHDEN Co., Ltd., "retrieval on Aug. 30, 2010", internet <URL; http://www.hkd.co.jp/technique/img/amr-note1.pdf>).

As shown in FIG. 1, the control apparatus 10 calculates a position and a moving speed of the mover 25 on the stator 21 based on a signal output from the MR sensor 27. The control apparatus 10 allows a current to flow to the plurality of coils of the armature 60 according to the calculated position and speed of the mover 25 and a position command value input from a higher-level control apparatus.

Accordingly, the mover 25 is driven along the track rail 23 by the action of a magnetic field generated in the plurality of coils and a magnetic field generated by the drive magnets 24 disposed in the stator 21.

Figure 3:
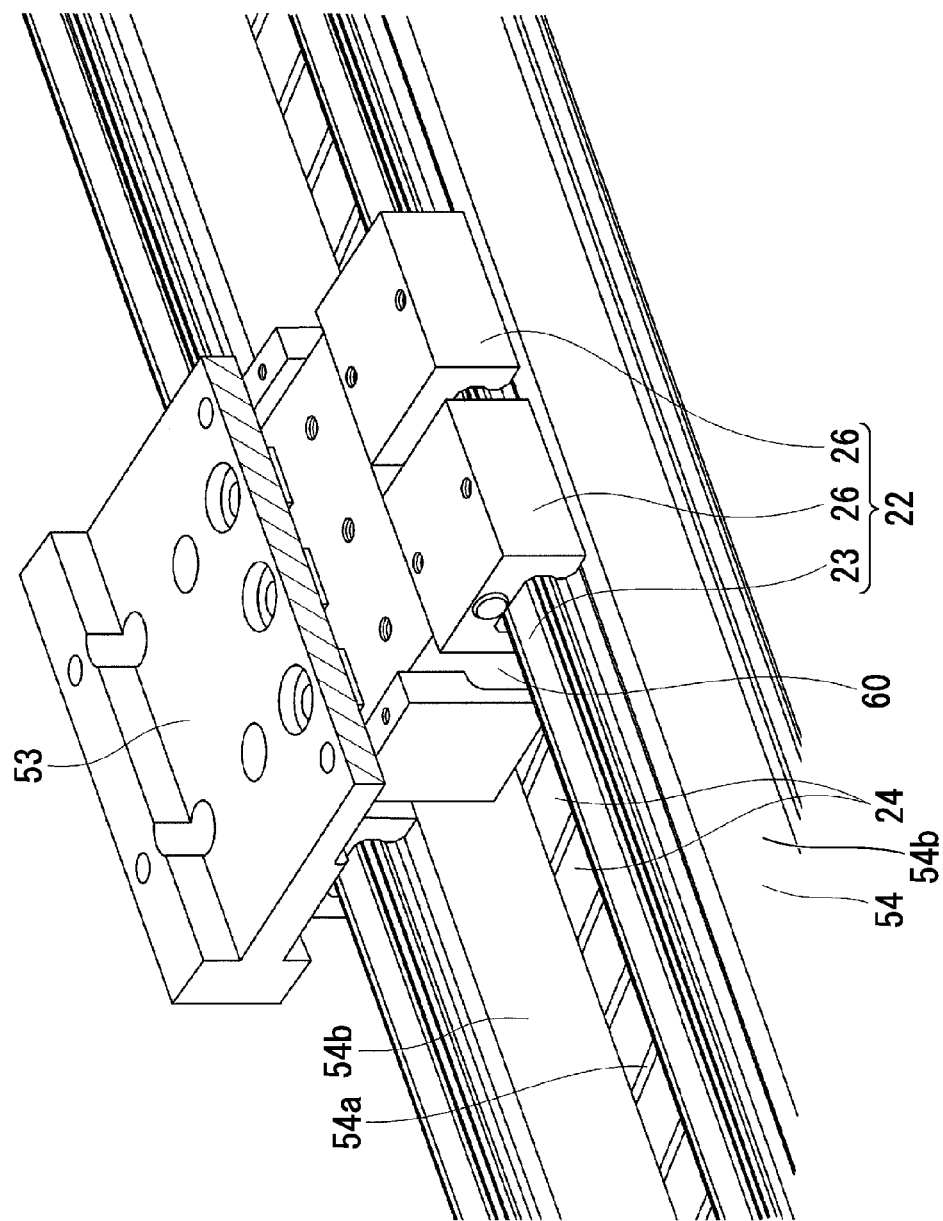
FIG. 3 is a perspective view of a linear motor 20 of the first embodiment.
Figure 4:
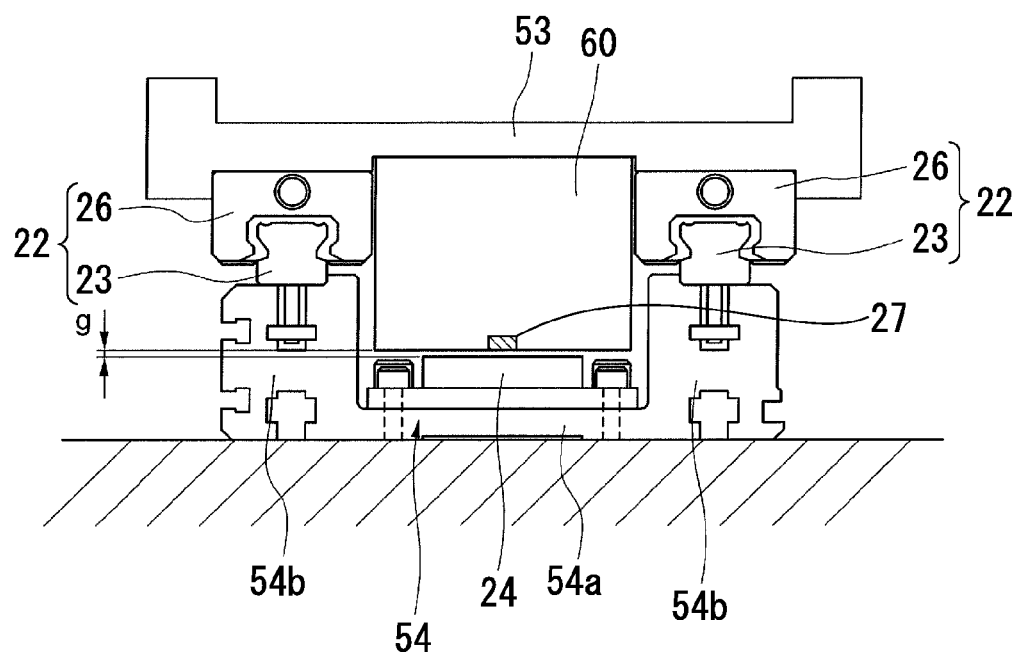
FIG. 4 is a front view of the linear motor 20 of the first embodiment.

A configuration of the linear motor 20 of the first embodiment is described using FIGS. 3 and 4.

FIG. 3 is a perspective view of the linear motor 20 of the first embodiment (including a cross-section of the table 53). FIG. 4 is a front view of the linear motor 20 of the first embodiment.

In the linear motor 20, the stator 21 is provided with a plurality of plate-like drive magnets 24 which is arranged such that their surfaces magnetized to an N-pole or an S-pole face to the mover 25. The linear motor 20 is a flat-type linear motor in which the mover 25 moves linearly relative to the stator 21. The armature 60 of the mover 25 is opposed to the drive magnet 24 with a gap g interposed therebetween.

The stator 21 has an elongated base 54. The plurality of drive magnets 24 are arranged in a row in the moving direction on the base 54. The base 54 is composed of a bottom wall portion 54a and a pair of side wall portions 54b arranged on both sides of the bottom wall portion 54a in a width direction. The plurality of drive magnets 24 are attached to the bottom wall portion 54a.

The respective drive magnets 24 have an N-pole and an S-pole formed in both end surfaces in a direction perpendicular to the moving direction (a vertical direction in FIG. 4). The plurality of drive magnets 24 are arranged in a state in which magnetic poles of a pair of drive magnets 24 adjacent to each other are reverse to each other.

Accordingly, when the mover 25 moves, magnetic poles of N-poles and S-poles of the drive magnets 24 are alternately opposed to the MR sensor 27 attached to the mover 25.

The track rail 23 of the guide apparatus 22 is attached to an upper surface of the side wall portion 54b of the base 54. The slide block 26 is mounted on the track rail 23 so as to be capable of sliding thereon. A plurality of balls are interposed between the track rail 23 and the slide block 26 so as to be capable of rolling (not shown).

The slide block 26 is provided with a track-like ball circulation channel for circulating the plurality of balls.

When the slide block 26 slides on the track rail 23, the plurality of balls roll between the track rail 23 and the slide block 26. In addition, the plurality of balls circulate in the ball circulation channel. Accordingly, the slide blocks 26 can smoothly move in a straight line.

The table 53 of the mover 25 is attached to an upper surface of the slide block 26 of the guide apparatus 22. The table 53 is made of a non-magnetic material such as aluminum. A moving target is attached to the table 53. The armature 60 is suspended from a lower surface of the table 53.

As shown in the front view of FIG. 4, the gap g is formed between the drive magnet 24 and the armature 60. The guide apparatus 22 also keeps the gap g constant when the armature 60 moves relative to the drive magnet 24.

Figure 5:
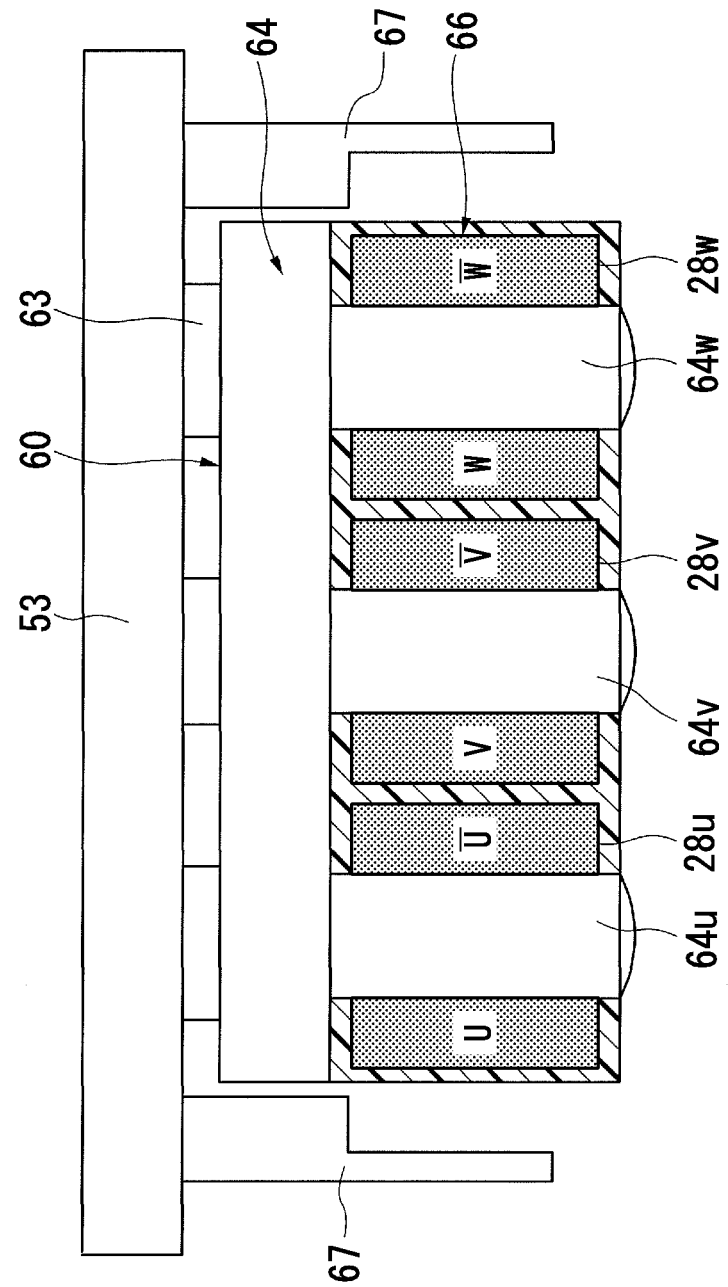
FIG. 5 is a cross-sectional view of a mover 25 of the first embodiment in a moving direction of a mover 25.

FIG. 5 is a cross-sectional view of the mover 25 of the first embodiment in the moving direction of the mover 25.

The armature 60 is attached to the lower surface of the table 53 with a heat insulator 63 interposed therebetween. The armature 60 is formed of a core 64 made of a magnetic material such as silicon steel and a plurality of coils. The plurality of coils have coils 28u, 28v, and 28w which are wound on salient poles 64u, 64v, and 64w of the core 64.

The coils 28u, 28v, and 28w are supplied with a three-phase AC (alternating current) having a phase difference from the control apparatus 10.

The three coils 28u, 28v, and 28w are wound on the salient poles 64u, 64v, and 64w. Then, the three coils 28u, 28v, and 28w are sealed with a resin.

A pair of auxiliary cores 67 are attached to the lower surface of the table 53 with the armature 60 put therebetween. The auxiliary core 67 is provided to reduce cogging which occurs in the linear motor 20.

Figure 6:
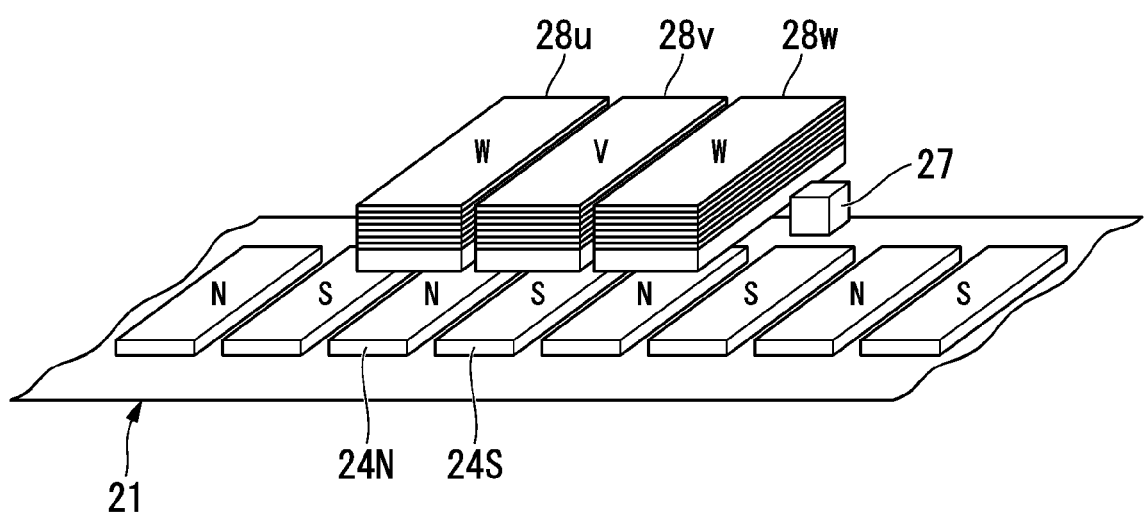
FIG. 6 is a schematic view showing relative positions between the MR sensor 27, coils 28u, 28v, and 28w and drive magnets 24 of the first embodiment.

FIG. 6 is a schematic view showing relative positions between the MR sensor 27, the coils 28u, 28v, and 28w and the drive magnets 24 of the first embodiment.

In the stator 21, the drive magnets 24 are arranged in a row at regular intervals on the bottom wall portion 54a of the base 54. Drive magnets 24N whose N-pole surfaces face to the MR sensor 27 and drive magnets 24S whose S-pole surfaces face to the MR sensor 27 are alternately arranged.

In the mover 25, the coils 28u, 28v, and 28w are arranged so as to pass along a straight line which passes through the centers of the drive magnets 24 disposed in the stator 21 and is parallel to the moving direction. The MR sensor 27 is attached as in the cases of the coils 28*u*, 28*v*, and 28*w*. The MR sensor 27 is attached to a position passing through the center of each drive magnet 24 and passing on a straight line parallel to the moving direction. Accordingly, the MR sensor 27 can be allowed to pass through a position of the strongest magnetic field which is generated by the drive magnets 24.

Figure 7:
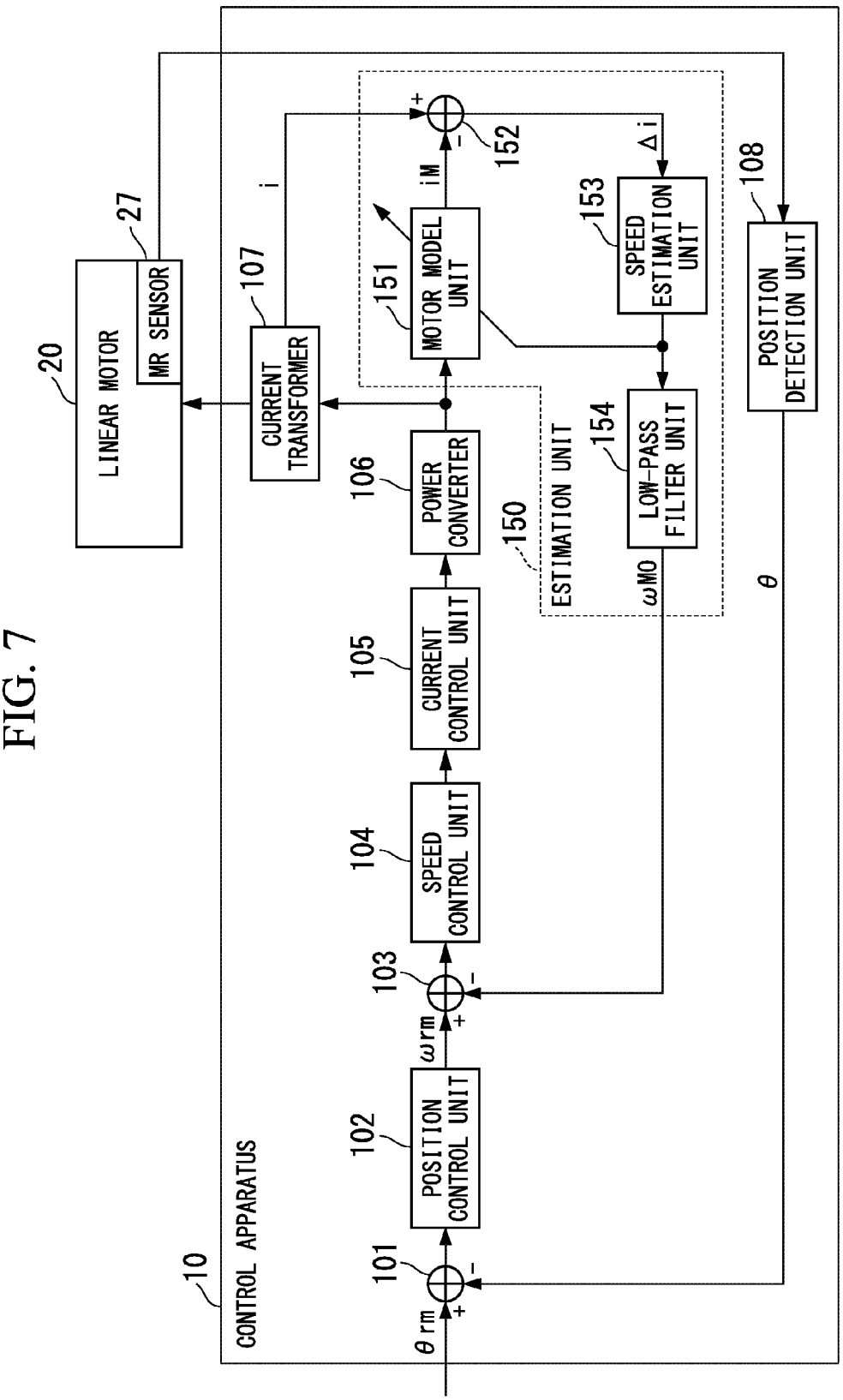
FIG. 7 is a schematic block diagram showing a configuration of a control apparatus 10 for the linear motor 20 of the first embodiment.

FIG. 7 is a schematic block diagram showing a configuration of the control apparatus 10 for the linear motor 20 of the first embodiment.

The control apparatus 10 is provided with a subtracter 101, a position control unit 102, a subtracter 103, a speed control unit 104, a current control unit 105, a power converter 106, a current transformer 107, a position detection unit 108, and an estimation unit 150.

The subtracter 101 calculates a position deviation by subtracting a detection position θ which is input from the position detection unit 108 from a position command value θrm which is input from the higher-level control apparatus (not shown).

The detection position θ indicates a position of the mover 25 of the linear motor 20 when the origin is a predetermined position.

The position control unit 102 calculates a speed command value ωrm for moving the mover 25 of the linear motor 20 to a position which is indicated by the position command value θrm based on the position deviation calculated by the subtracter 101.

The subtracter 103 subtracts an estimation speed ωMO of the mover 25 which is input from the estimation unit 150 from the speed command value ωrm calculated by the position control unit 102. The subtracter 103 calculates a subtraction result (a speed deviation).

The estimation speed ωMO is a moving speed of the mover 25 which is estimated by the estimation unit 150 from the voltage which is applied to the linear motor 20 and the current flowing to the linear motor 20.

The speed control unit 104 calculates a current command value indicating a current value of a current flowing to the coils 28*u*, 28*v*, and 28*w* of the linear motor 20 based on the speed deviation calculated by the subtracter 103 so that the moving speed of the mover 25 of the linear motor 20 is the same as the speed command value ωrm.

The speed control unit 104 calculates the current command value so that the speed deviation becomes "zero". The speed control unit 104 calculates the current command value so that the moving speed of the mover 25 is the same as the speed command value ωrm by, for example, PI control, PID control, or the like.

The speed control unit 104 performs vector control to output the current command value including two current values of a d-axis and a q-axis of a rotation coordinate system from the speed command value.

The current control unit 105 performs two-phase to three-phase conversion of the current command value calculated by the speed control unit 104. The current control unit 105 calculates a voltage value of a voltage which is applied to the coils 28*u*, 28*v*, and 28*w* of the linear motor 20.

The power converter 106 converts a voltage which is supplied from the outside into a voltage value which is calculated by the current control unit 105. The power converter 106 applies the converted voltage to the coils 28*u*, 28*v*, and 28*w* of the linear motor 20 to drive the linear motor 20. The power converter 106 applies the converted voltage to the estimation unit 150.

The power converter 106 has an upper arm and a lower arm which are provided according to the number of the coils 28*u*, 28*v*, and 28*w* of the linear motor 20. The upper arm and the lower arm have a switching element.

At this time, the power converter 106 supplies power to the coils 28*u*, 28*v*, and 28*w* of the armature 60 via the switching element by PWM control for switching ON/OFF of the switching element according to the voltage which is input from the current control unit 105 to drive the mover 25.

For example, a semiconductor element such as an insulated gate bipolar transistor (IGBT) is used as the switching element.

The current transformer 107 is attached to a power line which connects the power converter 106 and the linear motor 20. The current transformer 107 detects a current value i of the current flowing to the linear motor 20.

The position detection unit 108 detects a position of the mover 25 from two signals (a cosine-wave signal, a sine-wave signal) which are output from the magnetic sensor 27 of the linear motor 20. The position detection unit 108 outputs a detection position θ indicating the detected position to the subtracter 101.

The estimation unit 150 has a motor model unit 151, a subtracter 152, a speed estimation unit 153, and a low-pass filter unit 154.

The motor model unit 151 calculates an estimation current value iM of a current flowing to the linear motor 20 based on a voltage applied to the linear motor 20 by the power converter 106, an estimation moving speed of the mover 25 estimated by the speed estimation unit 153, and a predetermined motor constant of the linear motor 20.

The motor constant is, for example, a resistance value of the linear motor 20, an inductance value of the d-axis, an inductance value of the q-axis, an induced voltage coefficient, or the like.

The subtracter 152 calculates a current deviation Δi by subtracting the estimation current value iM calculated by the motor model unit 151 from the current value i detected by the current transformer 107.

The speed estimation unit 153 calculates the estimation moving speed of the mover 25 of the linear motor 20 from the current deviation Δi calculated by the subtracter 152. The speed estimation unit 153 outputs a signal indicating the calculated estimation moving speed to the motor model unit 151 and the low-pass filter unit 154.

The low-pass filter unit 154 eliminates a high-frequency pulsating component which is included in the estimation moving speed calculated by the speed estimation unit 153. The low-pass filter unit 154 outputs the estimation moving speed from which the pulsating component is eliminated (an estimation speed ωMO) to the subtracter 103.

Due to such a configuration, the estimation unit 150 calculates an estimate of the moving speed of the mover 25 of the linear motor 20 (an estimation moving speed) based on the voltage value of the voltage which is applied to the linear motor 20 and the current value i of the current flowing to the linear motor 20 (reference literature: Yoji Takeda, Nobuyuki Matsui, Shigeo Morimoto, and Yukio Honda, "Design and Control of Interior Permanent Magnet Synchronous Motor", third impression of the first edition, Ohmsha, July 2004, pp. 111-115).

The linear motor apparatus 1 is provided with the position control unit 102 which performs position control to calculate the speed command value using the detection position θ detected by the MR sensor 27, and the speed control unit 104 which performs speed control to calculate the current command value using the estimation speed ωMO estimated by the estimation unit 150. Accordingly, even when the detection position θ includes an error, the linear motor apparatus 1 can reduce an influence of the error on the current command value by using the estimation speed ωMO.

The linear motor apparatus 1 of the first embodiment can reduce the influence of the error of the detection position θ in the calculation of the current command value, as compared to the case in which the speed of the mover 25 is calculated only from an amount of a change in the detection position θ.

Accordingly, the accuracy of controlling the linear motor 20 is improved without using a linear scale, and thus it is possible to accurately perform repeated positioning control of the mover 25 of the linear motor 20, and to improve the positioning accuracy.

The control apparatus 10 performs position control to calculate the speed command value using the detection position θ detected by the MR sensor 27 and speed control to calculate the current command value using the estimation speed ωMO estimated by the estimation unit 150 in a parallel way. The control apparatus 10 has no need to switch the control as in the technique described in Patent Literature 1. The control apparatus 10 can reduce unevenness in the moving speed of the mover 25, and can smoothly control the linear motor 20.

Second Embodiment

Figure 8:
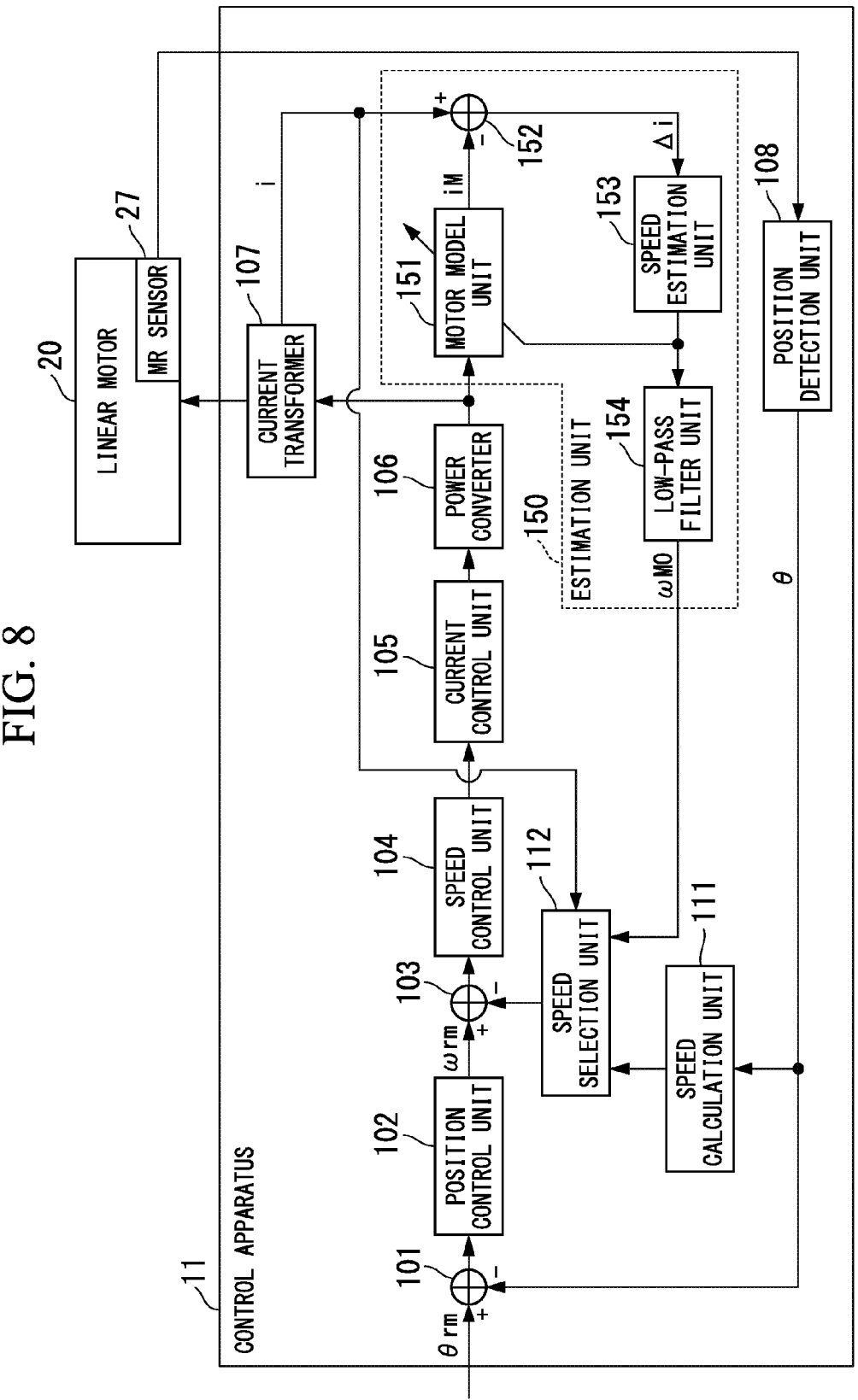
FIG. 8 is a schematic block diagram showing a configuration of a control apparatus 11 for a linear motor 20 of a second embodiment.

FIG. 8 is a schematic block diagram showing a configuration of a control apparatus 11 for a linear motor 20 of a second embodiment. The control apparatus 11 of the second embodiment is different from the control apparatus 10 of the first embodiment in that a speed calculation unit 111 and a speed selection unit 112 are provided.

Hereinafter, the speed calculation unit 111 and the speed selection unit 112 are described. In addition, other configurations which are the same as those in the first embodiment are denoted by the same reference signs and descriptions thereof are omitted.

The speed calculation unit 111 calculates a moving speed of the mover 25 from a change per unit hour of the detection position θ which is detected by the position detection unit 108.

The speed selection unit 112 selects any one of the estimation speed ωMO which is output from the low-pass filter unit 154 of the estimation unit 150 and the moving speed which is calculated by the speed calculation unit 111, based on a magnitude of the current value i which is detected by the current transformer 107, and outputs the speed to a subtracter 103.

The subtracter 103 subtracts the speed selected by the speed selection unit 112 from the speed command value ωrm calculated by the position control unit 102. The subtracter 103 outputs the subtraction result as the speed deviation to the speed control unit 104.

When the current value i detected by the current transformer 107 is smaller than a predetermined current value (a threshold), the speed selection unit 112 selects the moving speed calculated by the speed calculation unit 111. When the current value i is greater than or equal to the threshold, the speed selection unit 112 selects the estimation speed ωMO calculated by the estimation unit 150.

Due to such a configuration, the linear motor apparatus of the second embodiment obtains the same effects as the linear motor apparatus 1 of the first embodiment. The linear motor apparatus of the second embodiment is provided with the position control unit 102 which performs position control to calculate the speed command value using the detection position θ detected by an MR sensor 27, and the speed control unit 104 which performs speed control to calculate the current command value using the estimation speed ωMO estimated by the estimation unit 150. Accordingly, even when the detection position θ includes an error, the linear motor apparatus of the second embodiment can reduce an influence of the error on the current command value by using the estimation speed ωMO.

In the linear motor apparatus of the second embodiment, the control apparatus 11 selects any one of the estimation speed ωMO estimated by the estimation unit 150 and the moving speed calculated based on the signal output from the magnetic sensor 27, on the basis of the magnitude of the current value i detected by the current transformer 107. The control apparatus 11 performs speed control using the selected speed.

When the current value i detected by the current transformer 107 is smaller than the threshold, the estimation error of the estimation speed ωMO calculated by the estimation unit 150 easily increases. Accordingly, the control apparatus 11 controls the linear motor 20 using the moving speed calculated by the speed calculation unit 111. On the other hand, when the current value i detected by the current transformer 107 is greater than or equal to the threshold, the estimation error of the estimation speed ωMO calculated by the estimation unit 150 does not easily increase. Accordingly, the control apparatus 11 controls the linear motor 20 using the estimation speed ωMO.

Accordingly, when the current value i of the current flowing to the linear motor 20 is small and the estimation error of the estimation speed ωMO easily increases, the control apparatus 11 performs speed control using the speed based on the signal output from the magnetic sensor 27. Thus, it is possible to prevent a reduction in the control accuracy of the linear motor 20 and to improve the positioning accuracy.

In the first and second embodiments, the configuration in which the control apparatuses 10 and 11 control the flat-type linear motor 20 in which the mover 25 provided with the armature 60 moves linearly relative to the stator 21 provided with the drive magnets 24 has been described. However, the present invention is not limited to the configuration for controlling the flat-type linear motor 20.

The control apparatus 10 may be applied to a rod-type linear motor in which a mover provided with a rod-type drive magnet moves linearly relative to a stator provided with an armature (a coil).

In addition, in the first and second embodiments, the configuration in which the drive magnets 24 are arranged in a row on a straight line has been described, but the present invention is not limited thereto. The drive magnets 24 may be arranged in a row in a curved shape according to the use of the linear motor 20.

The control apparatuses 10 and 11 of the first and second embodiments may have a computer system provided therein. In this case, the processes of the subtracters, the position control unit, the speed control unit, the current control unit, the estimation unit, the position detection unit, the speed calculation unit, and the speed selection unit are stored on a computer-readable storage medium in the form of a program. When the program is read out and executed by a computer, the above-described processes are performed.

The computer-readable storage medium is a magnetic disc, a magneto-optical disc, a CD-ROM, a DVD-ROM, a semiconductor memory, or the like. The computer program may be delivered to a computer by a communication line, and the computer receiving the delivery may execute the computer program.

REFERENCE SIGNS LIST

1: linear motor apparatus
10, 11: control apparatus

20: linear motor
21: stator
24, 24N, 24S: drive magnet
25: mover
27: MR sensor (magnetic sensor)
101, 103, 152: subtracter
102: position control unit
104: speed control unit
105: current control unit
106: power converter
107: current transformer
108: position detection unit
111: speed calculation unit
112: speed selection unit
150: estimation unit
151: motor model unit
152: subtracter
153: speed estimation unit
154: low-pass filter unit

The invention claimed is:

1. A control apparatus for a linear motor which includes a magnet unit which has a plurality of drive magnets in which N-poles and S-poles are alternately arranged in a row, and an armature which has a plurality of coils, and in which any one of the armature and the magnet unit is a mover, and the mover moves in an arrangement direction in which the drive magnets are arranged by a magnetic field generated by allowing a current to flow to the plurality of coils of the armature and a magnetic field generated by the plurality of drive magnets of the magnet unit, the control apparatus comprising:

a position detection unit which detects a position of the mover based on a change in a signal output from a magnetic sensor which the armature has, the magnetic sensor outputting the signal according to a direction of the magnetic field generated by the drive magnets;

a position control unit which calculates a speed command value based on the position of the mover detected by the position detection unit and a position command value input from outside the control apparatus;

an estimation unit which estimates a moving speed of the mover from a current value of the current flowing to the plurality of coils of the linear motor;

a speed control unit which calculates a current command value based on the speed command value calculated by the position control unit and the moving speed of the mover estimated by the estimation unit; and a power converter which supplies power to the plurality of coils according to the current command value calculated by the speed control unit.

2. The control apparatus for the linear motor according to claim 1, wherein the estimation unit includes:
a motor model unit which calculates a current value of the current flowing to the plurality of coils based on a voltage which is applied to the plurality of coils, an estimation speed which is obtained by estimating the moving speed of the mover, and a motor constant of the linear motor;

a speed estimation unit which calculates the estimation speed using a current deviation which is obtained by subtracting the current value calculated by the motor model unit from the current value of the current flowing to the plurality of coils; and a low-pass filter unit which eliminates a high-frequency pulsating component from the estimation speed calculated by the speed estimation unit.

3. The control apparatus for the linear motor according to claim 2, further comprising:

a speed calculation unit which calculates a moving speed of the mover from a change in the position of the mover detected by the position detection unit; and a speed selection unit which selects the moving speed calculated by the speed calculation unit when the current value of the current flowing to the plurality of coils is smaller than a predetermined threshold, and selects the estimation speed when the current value is greater than or equal to the threshold, wherein the speed control unit calculates the current command value based on the speed command value calculated by the position control unit and the speed selected by the speed selection unit.

4. A linear motor apparatus comprising:

a linear motor which includes a magnet unit which has a plurality of drive magnets in which N-poles and S-poles are alternately arranged in a row, and an armature which has a plurality of coils, and in which any one of the armature and the magnet unit is a mover, and the mover moves in an arrangement direction in which the drive magnets are arranged by a magnetic field generated by allowing a current to flow to the plurality of coils of the armature and a magnetic field generated by the plurality of drive magnets of the magnet unit; and a control apparatus which includes a position detection unit which detects a position of the mover based on a change in a signal output from a magnetic sensor which the armature has, the magnetic sensor outputting the signal according to a direction of the magnetic field generated by the drive magnets, a position control unit which calculates a speed command value based on the position of the mover detected by the position detection unit and a position command value input from outside the control apparatus, an estimation unit which estimates a moving speed of the mover from a current value of the current flowing to the plurality of coils of the linear motor, a speed control unit which calculates a current command value based on the speed command value calculated by the position control unit and the moving speed of the mover estimated by the estimation unit, and a power converter which supplies power to the plurality of coils according to the current command value calculated by the speed control unit.

* * * * *